Patented July 29, 1941

2,251,101

UNITED STATES PATENT OFFICE 2,251,101

LEAD NITROAMINOGUANIDINE AND A PROCESS OF MAKING IT

Kenneth D. Ashley, Darien, Conn., assignor to American Cyanamid Company, New York, N. Y., a corporation of Maine No Drawing. Application November 7, 1939, Serial No. 303,300

3 Claims. (Cl. 260—435)

The present invention relates to the lead salt of the pseudo acid of nitroaminoguanidine, and to a method of preparing the same according to the following reaction:

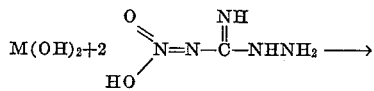

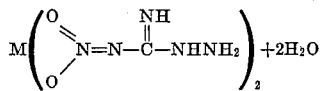

where M is Pb, Cu or Ba.

Nitroaminoguanidine was prepared by dissolving 165 g. of hydrazine sulfate in 3500 cc. of ammonium hydroxide solution (1N). 135 g. of nitroguanidine was added to the solution over a period of approximately 15 minutes with mild agitation. The mixture was stirred at 40° C. for one hour and then at 65° C. for one hour. The solution was vacuum concentrated to 600 cc.

The concentrated solution was then cooled to 15° C. whereupon crystals of nitroaminoguanidine were precipitated. This product was recrystallized as follows: 122 g. of washed and dried crystals of crude nitroaminoguanidine prepared as above were dissolved in 1000 cc. of water at 95° C. and 2 g. of Darco added. After agitation, the liquid was filtered and the filtrate cooled to 10° C., and the resultant nitroaminoguanidine recovered. The dried product was white and had a melting point of 182° C. Upon recrystallization from water, the melting point was 187° C.

9 g. of the above crystals of nitroaminoguanidine was further purified by dissolving the same in 300 cc. of water and 45 cc. of concentrated hydrochloric acid. The solution was neutralized to pH6 with 20% sodium carbonate. A white product was thus obtained having a melting point of 187.5° C.

Example I 9 g. of the above purified nitroaminoguanidine was dissolved in 300 cc. of water at 83° C. 9 g. of pure precipitated lead hydroxide were added to the solution which was rapidly agitated for 15 minutes at from 70–80° C. It was then cooled to 15° C. and the yellow prismatic crystals filtered, washed with alcohol and dried at 35° C. The fact that this salt forms only in alkaline solution indicates that it is the lead salt of the pseudo acid of nitroaminoguanidine having the following formula:

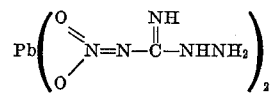

Example II 3 g. of nitroaminoguanidine prepared as above and purified by recrystallization from hydrochloric acid solution were dissolved in 75 cc. of water at 85° C. 3 g. of CuSO$_4$.5H$_2$O in 10 cc. of water were added, followed by 1 g. of sodium hydroxide. The mixture was stirred rapidly and cooled in an ice bath. The brownish colored crystals were filtered, washed with a little water and alcohol and dried at 70° C. The salt thus obtained, corresponds to the formula:

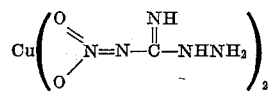

Example III 6 g. of nitroaminoguanidine prepared as above and recrystallized from hydrochloric acid solution was dissolved in 120 cc. of hot water and to this hot solution was added a slurry of 8 g. Ba(OH)$_2$.H$_2$O in hot water. The materials nearly all dissolved and on standing, white crystals separated. They were washed with alcohol and dried. This salt corresponds to the formula:

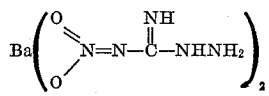

These salts have explosive properties. For instance, nitroaminoguanidine when touched with a red hot iron, flares only where it is touched, while the whole of a long, thin train of the lead salt is violently exploded by touching it at one end with a wire heated to dull redness. The copper salt behaves much like the lead salt when fired with a hot wire, and detonates when struck with a hammer on an anvil. The barium salt partakes of the properties of both the lead and copper compounds.

While the invention has been described with specific reference to specific embodiments, it is to be understood that it is not to be limited thereto, but is to be construed broadly and restricted solely by the scope of the appended claims.

I claim:

1. A method of preparing the lead salt of the pseudo acid of nitroaminoguanidine which comprises reacting a water solution of nitroaminoguanidine with lead hydroxide, cooling the solution to throw out crystals of the lead salt of the pseudo acid of nitroaminoguanidine and recovering the latter.

2. A method of preparing the lead salt of the pseudo acid of nitroaminoguanidine which comprises reacting one part of nitroaminoguanidine dissolved in water at 80° C. with one part of lead hydroxide with agitation, cooling the mixture to a crystal-forming temperature and recovering the crystals.

3. The lead salt of the pseudo acid of nitroaminoguanidine having the following formula—

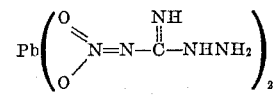

KENNETH D. ASHLEY.